United States Patent
Im (10) Patent No.: US 8,502,953 B2
(45) Date of Patent: Aug. 6, 2013

(54) LIQUID CRYSTAL LENS ELECTRICALLY DRIVEN AND STEREOSCOPIC DISPLAY DEVICE USING THE SAME

(75) Inventor: Hee-Jin Im, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 333 days.

(21) Appl. No.: 12/912,176

(22) Filed: Oct. 26, 2010

(65) Prior Publication Data

US 2011/0096252 A1    Apr. 28, 2011

(30) Foreign Application Priority Data

Oct. 27, 2009  (KR) .................. 10-2009-0102379

(51) Int. Cl.
  *G02F 1/13*      (2006.01)
  *G02F 1/1335*    (2006.01)
(52) U.S. Cl.
  USPC ........................................... 349/200; 349/15
(58) Field of Classification Search
  USPC ..................................... 349/15, 200
  See application file for complete search history.

(56) References Cited

U.S. PATENT DOCUMENTS

2009/0015737 A1   1/2009   Jung et al.
2009/0190049 A1*  7/2009   Hong et al. .................. 349/15

FOREIGN PATENT DOCUMENTS

CN     101344698 A    1/2009

OTHER PUBLICATIONS

Li et al., "Switchable electro-optic diffractive lens with high efficiency for ophthalmic applications," PNAS, vol. 103, No. 16: pp. 6100-6104 (Apr. 18, 2006).
Office Action issued in counterpart Chinese Patent Application No. 201010293534.X dated Oct. 16, 2012.

* cited by examiner

*Primary Examiner* — Nathanael R Briggs
(74) *Attorney, Agent, or Firm* — Morgan, Lewis & Bockius LLP (57) ABSTRACT

A liquid crystal lens electrically driven and stereoscopy display device using the same are disclosed, by which a thickness of a liquid crystal layer provided to the liquid crystal lens electrically driven is reduced in a manner of applying fresnel lens within a pitch anisotropically.

11 Claims, 9 Drawing Sheets

RELATED ART

FIG. 1

RELATED ART

Unit lens pitch

LIQUID CRYSTAL LENS ELECTRICALLY DRIVEN AND STEREOSCOPIC DISPLAY DEVICE USING THE SAME

This application claims the benefit of the Korean Patent Application No. 10-2009-0102379, filed on Oct. 27, 2009, which is hereby incorporated by reference as if fully set forth herein.

BACKGROUND OF THE INVENTION

1. Field of the Invention

The present invention relates to a display device, and more particularly, to a liquid crystal lens electrically driven and stereoscopy display device using the same. Although the present invention is suitable for a wide scope of applications, it is particularly suitable for reducing a thickness of a liquid crystal layer provided to the liquid crystal lens electrically driven in a manner of applying Fresnel lens within a pitch anisotropically.

2. Discussion of the Related Art

Generally, services for high speed information transfer, which will be established based on very high speed information communication network, develop into 'viewing and listening' multimedia type services with a digital terminal capable of high speed processing of text, speech and video from 'listening and speaking' services such as a phone service and are expected to eventually develop into hyper-space type real 3D stereoscopic information communication services for 'viewing, feeling and enjoying stereoscopic reality by transcending time and space'.

A stereoscopic image for representing 3 dimensions is achieved according to the principle of stereo vision via both eyes in general. Since there exists a binocular parallax (i.e., both eyes are spaced apart from each other by about 65 mm), right and left eyes view slightly different images due to the position difference between both eyes. Thus, the image difference attributed to the position difference between both eyes is called binocular disparity. And, the 3D stereoscopic video display device uses the binocular disparity to enable left and right eyes to just see images for left and right eyes, respectively.

In particular, left and right eyes see different 2D images, respectively. The two images are delivered to a brain via retinas. The brain synthesizes the delivered images together to reproduce depth and reality of the original 3D image. This capability is called stereography and a device applying the stereography thereto is called a stereoscopy display device.

Meanwhile, the stereoscopy display device can be classified according to components that construct lens for 3D (3-dimension) implementation. For instance, a type of constructing a lens using a liquid crystal layer is called a liquid crystal field lens type.

A liquid crystal display device normally consists of two electrodes and a liquid crystal layer provided between the two electrodes. An electric field generated from applying a voltage to the two electrodes drives liquid crystal molecules of the liquid crystal layer. The liquid crystal molecules have polarization and optical anisotropy. In this case, the polarization indicates that molecular arrangement direction is changed according to an electric field and the electric charges of the liquid crystal molecules are attracted to both sides of the liquid crystal molecules when the liquid crystal molecules exist within the electric field. And, the optical anisotropy indicates a path or polarized state of a projected light is changed according to an incident direction or polarized state of an incident light due to a thin and long configuration of liquid crystal molecules and the aforesaid molecular arrangement direction.

Accordingly, the liquid crystal layer shows a transmittance difference by a voltage applied to two electrodes and is then able to display an image by differentiating the difference per pixel.

Recently, a liquid crystal lens electrically driven is proposed to enable a liquid crystal layer to play a role as a lens using the property of the liquid crystals.

In particular, a lens controls a path of an incident ray per position using a refractive index difference between air and a substance constructing the lens. If a liquid crystal layer is driven by forming an electric field by applying a different voltage per position of electrode in the liquid crystal layer, an incident ray entering the liquid crystal layer has a different phase change per position. Therefore, the liquid crystal layer is able to control the path of the incident ray like a real lens.

An electrically-driven liquid crystal lens according to a related art is explained with reference to the accompany drawings as follows.

Figure 1:
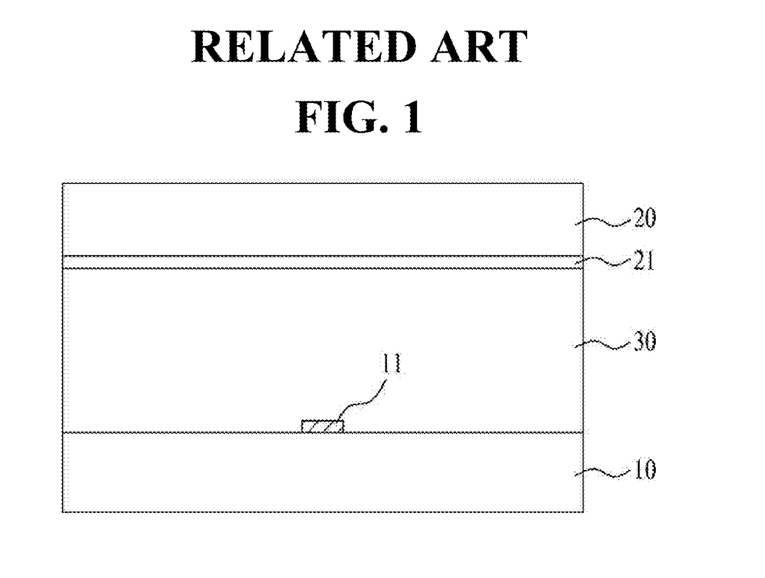
FIG. 1 is a cross-sectional diagram of an electrically-driven liquid crystal lens according to a related art.
Figure 2:
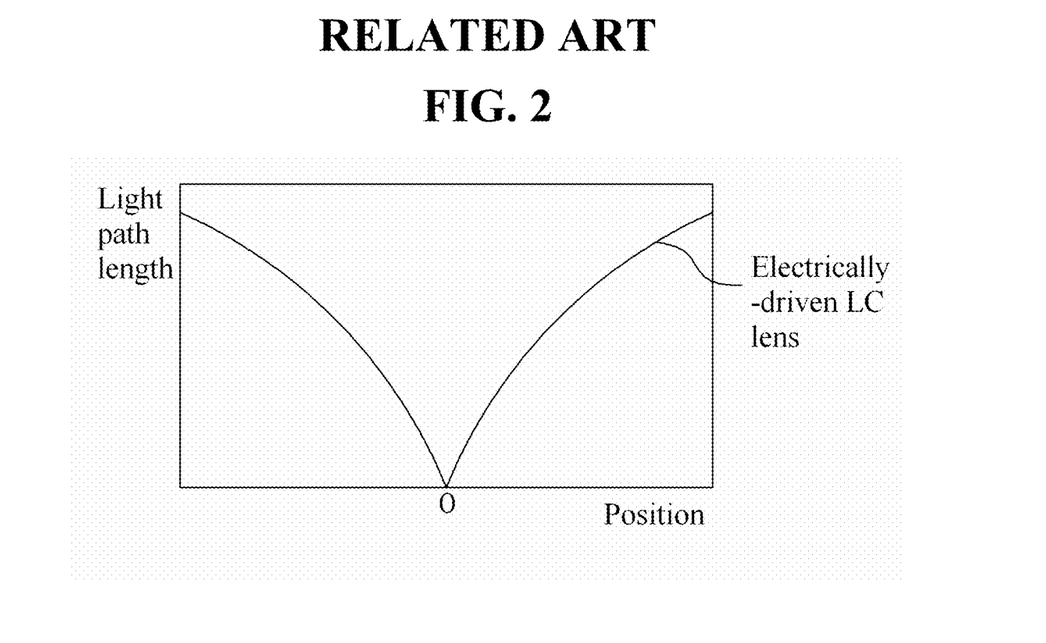
FIG. 2 is a graph of a potential distribution after voltage application in fabricating an electrically-driven liquid crystal lens.

FIG. 1 is a cross-sectional diagram of an electrically-driven liquid crystal lens according to a related art. FIG. 2 is a graph of a potential distribution after voltage application in fabricating an electrically-driven liquid crystal lens.

Referring to FIG. 1, an electrically-driven liquid crystal lens according to a related art consists of a first substrate 10, a second substrate 20 and a liquid crystal layer 30 provided between the first and second substrates 10 and 20.

In this case, a plurality of first electrodes 11 are formed on the first substrate 10 by being spaced apart from each other with a first spaced distance. Regarding the first electrodes 11 adjacent to each other, a distance between a center of one of the adjacent first electrodes 11 and the other is called a pitch. And, the identical patterns (first electrodes) are repeatedly formed using the pitch as a period.

And, a second electrode 21 is formed on the second substrate 20 configured to oppose the first substrate 10.

The first and second electrodes 11 and 21 are formed of transparent metal. The liquid crystal layer 30 is formed in the space between the first and second electrodes 11 and 21. Liquid crystals forming the liquid crystal layer 30 have a parabolic potential surface due to a characteristic reactive with strength and distribution of an electric field and corresponding have the phase distribution similar to that of an electrically-driven liquid crystal lens shown in FIG. 2.

The above-described electrically-driven liquid crystal lens is formed on the condition that a high voltage is applied to the first electrode 11 while the second electrode 21 is grounded. According to this voltage condition, a strongest vertical electric field is formed at the center of the first electrode 11. The vertical electric field becomes weaker if getting farther away from the first electrode 11. When the liquid crystal molecules constructing the liquid crystal layer 30 have anisotropy of positive dielectric constant, the liquid crystal molecules are arranged along an electric field. Therefore, the liquid crystal molecules stand vertical at the center of the first electrode 11. If the liquid crystal molecules are located farther from the first electrode 11, they tend to have arrangement inclining almost horizontally. In respect of light transfer, referring to FIG. 2, a light path at the center of the first electrode is short. If a position of the liquid crystal molecules becomes farther from the first electrode 11, the light path gets longer. If this light path is represented on a phase plane, it provides a light transfer effect similar to that of a lens having a parabolic surface.

In this case, the second electrode 21 causes fluctuation of a liquid crystal electric field to induce a refractive index of light into a spatially parabolic function. And, the first electrode 11 forms an edge area of the lens.

In doing so, the voltage applied to the first electrode 11 is slightly higher than that applied to the second electrode 21, whereby a potential difference is generated between the first and second electrodes 11 and 21, as shown in FIG. 2. Specifically, an abrupt lateral electric field is induced at a part of the first electrode 11. Consequently, the liquid crystals fail to form a smooth distribution but form a slightly distorted distribution, whereby spatial refractive index distribution is not parabolic or becomes very sensitive to a voltage.

The above electrically-driven liquid crystal lens can be fabricated in a manner of forming electrodes on both substrate by leaving the liquid crystals in-between without adopting a lens having a physically parabolic surface and then applying a voltage to the electrodes.

However, the related art electrically-driven liquid crystal lens causes the following problems.

First of all, since an electrode formed on a bottom substrate is provided to a very small portion of a lens area, an electric field between a lens edge area corresponding to the electrode and a lens center area getting farther from the lens edge area is not formed smoothly but induces an abrupt lateral electric field, whereby the electrically-driven liquid crystal lens has a slightly distorted phase. Particularly, in an electrically-driven liquid crystal lens formed by a liquid crystal electric field, if a pitch of a lens area is further increased, the electrode having a high voltage applied thereto is limited, an electric field generated between the electrode having the high voltage applied thereto in the lens area and an opposing substrate is not sufficient, it becomes more difficult to form an electrically-driven liquid crystal lens having a smoothly parabolic plane to provide the same effects of a lens.

Secondly, in a large-scale display device, since a lens center area getting distant from an edge area of a lens area, in which an electrode is located, barely has an electric field effect, it is difficult to adjust liquid crystal arrangement by an electric field in this area. Occasionally, if the adjustment in the lens center area is difficult or impossible, the corresponding electrically-driven liquid crystal lens has a discontinuous lens profile, thereby being difficult to be used as a lens.

Thirdly, a height (sag) of an electrically-driven liquid crystal lens per pitch formed according to a vertical electric field between a single electrode having a high voltage applied thereto and an electrode provided to a surface of an opposing substrate is equal and the electrically-driven liquid crystal lens should have upper and lower margin of the height. Thus, the electrically-driven liquid crystal lens needs a considerable amount of liquid crystals. As the height of the electrically-driven liquid crystal lens increases, the liquid crystal consumption increases by volume unit. Therefore, the cost is raised and the process performance is degraded, thereby requiring many efforts for enhancement.

Fourthly, a focal distance of an electrically-driven liquid crystal lens is inverse proportional to its height (sag). In order to fabricate an electrically-driven liquid crystal lens having a short focal distance, a liquid crystal layer needs a considerable height to result in a rising cost.

SUMMARY OF THE INVENTION

Accordingly, the present invention is directed to a liquid crystal lens electrically driven and stereoscopy display device using the same that substantially obviate one or more problems due to limitations and disadvantages of the related art.

An object of the present invention is to provide a liquid crystal lens electrically driven and stereoscopy display device using the same, by which thickness of a liquid crystal lens provided to the liquid crystal lens electrically driven is lowered in a manner of applying a fresnel lens within a pitch anisotropically.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an electrically-driven liquid crystal lens according to the present invention includes first and second substrates configured to oppose each other by having a plurality of lens areas defined correspondingly thereon; a plurality of first electrodes respectively provided to the lens areas of the first substrate in a manner of being spaced apart from each other, the first electrodes being spaced apart from each other; a second electrode formed on a whole surface of the second substrate; a first voltage source applying different voltages to sub-areas of each lens area to have different lens height corresponding to different sub-areas of each lens area; a second voltage source applying a constant voltage to the second electrode; and a liquid crystal layer provided between the first and second substrates.

Preferably, the voltage source applies the different voltages to a plurality of the sub-areas of each of the lens area, respectively to form a symmetric lens of a parabolic shape having a center of the lens area set to a peak in the sub-area including the center of the lens area and to form a lens of a triangle shape symmetric with respect to the left and right sub-areas of the lens area.

More preferably, when a voltage is applied to the voltage source, a greatest lens height is provided to the sub-area including the center of the lens area.

More preferably, the different voltages are increasingly applied to the sub-area including the center of the lens area in a manner of being applied to the first electrodes located in a range from a center of the sub-area to an edge of the sub-area, respectively.

More preferably, the different voltages are applied to the first electrodes for forming the lens of the triangle shape in the left and right sub-areas of the lens area in a manner that a value amounting to a curved surface of a virtual parabolic lens corresponds to one side of the lens of the triangle shape.

Preferably, a plurality of the first electrodes are formed on a same layer on the first substrate.

Preferably, the electrically-driven liquid crystal lens further includes at least one insulating layer on the first substrate. In this case, the at least one insulating layer and a plurality of the first electrodes are differently located on the first substrate.

In another aspect of the present invention, a stereoscopy display device includes an electrically-driven liquid crystal lens including first and second substrates arranged to oppose each other in a manner that a plurality of lens areas are defined therein, a plurality of first electrodes of a first group provided to the lens areas on the first substrate by being spaced apart from each other, a second electrode formed on a whole surface of the second substrate, and a liquid crystal layer inserted between the first and second substrates, a display panel provided under the electrically-driven liquid crystal lens to transfer a 2D video signal, and a voltage source configured to apply voltages different per sub-area to the first electrodes, respectively in a manner that each of the lens areas is divided into a plurality of sub-areas to differ from each other in lens height, the voltage source configured to apply a constant voltage to the second electrode.

Preferably, a 2D or 3D switching is performed according to an operation of the voltage source.

Preferably, in case of a 3D display, the voltages are applied to the first and second electrodes via the voltage source in a manner that the different voltages are applied to a plurality of the sub-areas of each of the lens area, respectively to form a symmetric lens of a parabolic shape having a center of the lens area set to a peak in the sub-area including the center of the lens area and to form a lens of a triangle shape symmetric with respect to the left and right sub-areas of the lens area.

More preferably, when a voltage is applied to the voltage source, a greatest lens height is provided to the sub-area including the center of the lens area.

Accordingly, the present invention provides the following effects and/or advantages.

First of all, when a thickness of a liquid crystal layer formed between electrodes on different substrates of an electrically-driven liquid crystal lens is defined, a lens area is divided into a plurality of sub-areas per pitch in a shape of a fresnel lens and a voltage is applied to each of the sub-areas. Therefore, a lens height at a highest point is lowered to reduce an overall thickness of the liquid crystal layer.

Secondly, different voltage apply sections according to a plurality of areas per pitch of the lens area are provided. A lens height has a decreasing value toward an edge from a center, and vice versa. Thus, if a liquid crystal layer is provided with a value resulting from adding a predetermined margin to a lens height of a highest point, an electrically-driven liquid crystal lens becomes drivable, whereby the liquid crystal layer does not need to have an extra margin in consideration of a discontinuity plane of a lens. Therefore, the present invention does not need to increase the thickness of the liquid crystal layer.

Thirdly, when a lens area is divided into a plurality of areas per pitch, limitation is put on the division for a plurality of the areas. Although the number of the sub-areas divided per pitch is not incremented, the present invention is able to reduce the thickness of the liquid crystal layer according to differential lens height distribution.

Fourthly, the present invention reduces a thickness of a liquid crystal layer, thereby providing a slim stereoscopy display device and reducing a rising cost. And, the present invention enables a focal distance to be decreased, thereby enhancing accuracy of a stereoscopy display.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a graph for a fresnel lens compared to a general electrically-driven liquid crystal lens if the electrically-driven liquid crystal lens shown in FIG. 3 or FIG. 4 is divided into a plurality of isotropic fresnel lenses;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 3:
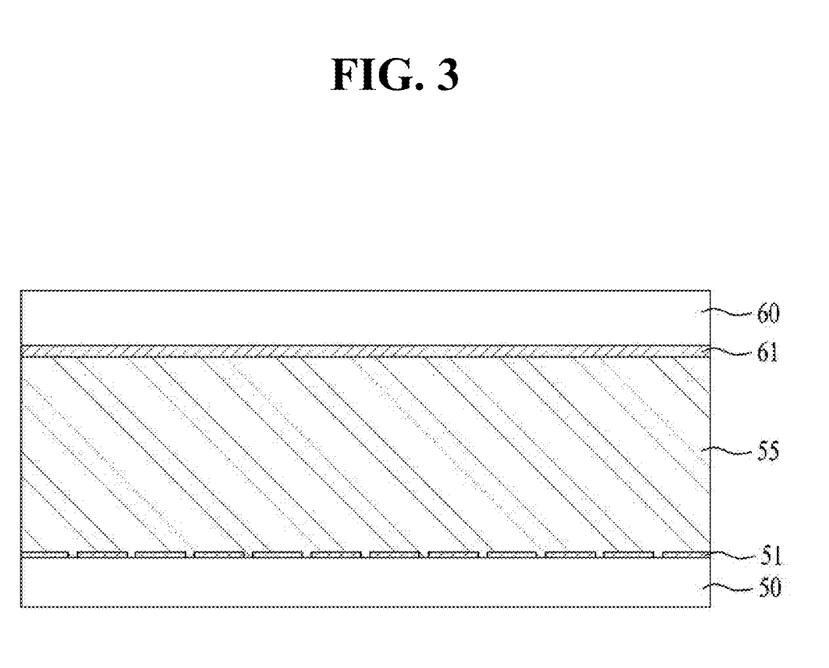
FIG. 3 is a cross-sectional diagram of an electrically-driven liquid crystal lens according to the present invention.
Figure 4:
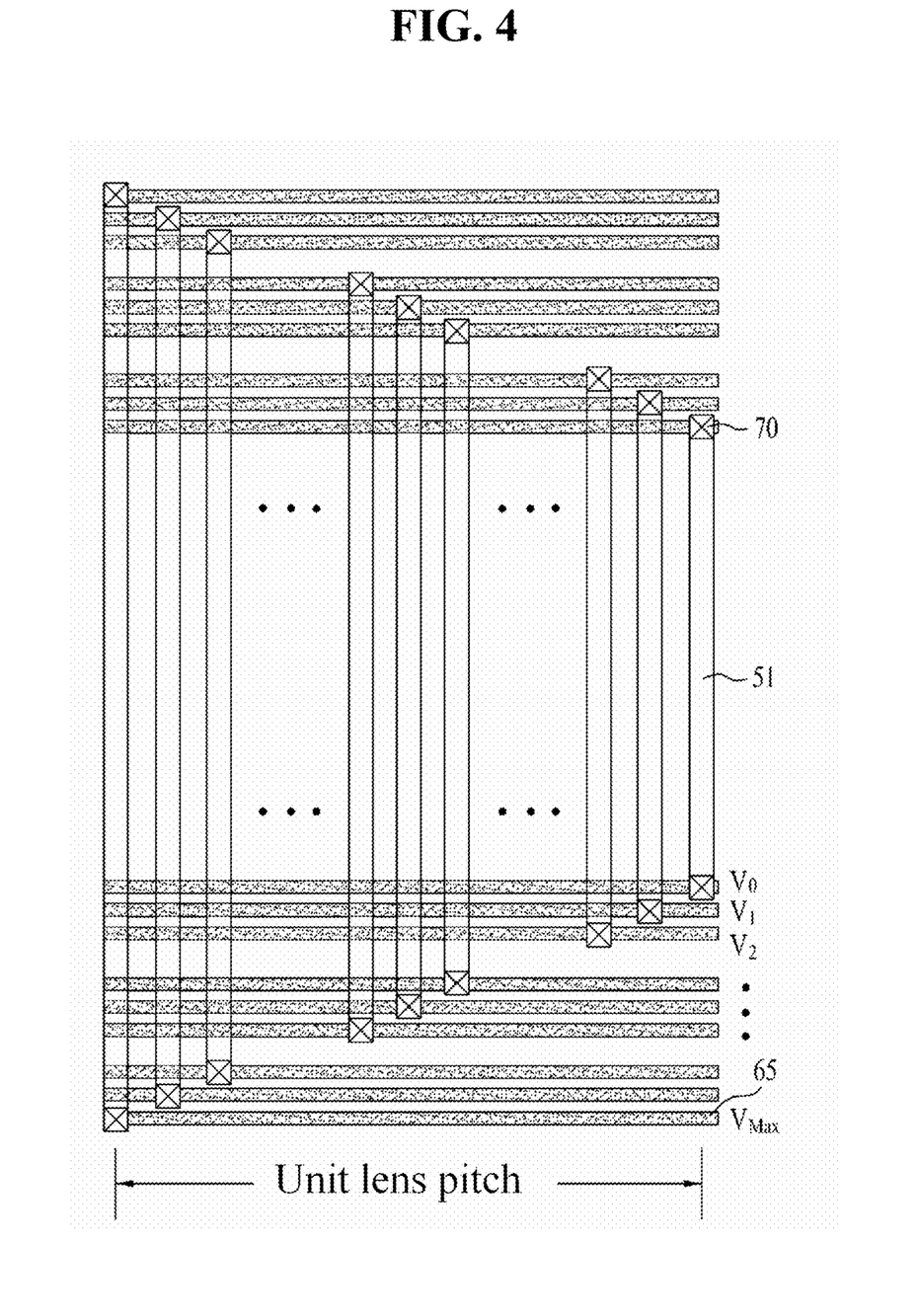
FIG. 4 is a layout for a type of applying a voltage to second electrodes corresponding to one pitch in a general electrically-driven liquid crystal lens.

FIG. 3 is a cross-sectional diagram of an electrically-driven liquid crystal lens according to the present invention. FIG. 4 is a layout for a type of applying a voltage to second electrodes corresponding to one pitch in a general electrically-driven liquid crystal lens.

Referring to FIG. 3 and FIG. 4, an electrically-driven liquid crystal lens according to the present invention includes first and second substrates 50 and 60 configured to oppose each other by having a plurality of lens areas defined correspondingly thereon, a plurality of first electrodes 51 provided to the lens areas of the first substrate 50, respectively in a manner of being spaced apart from each other, a second electrode 61 formed on a whole surface of the second substrate 60, a voltage sources (V0 to Vmax) configured to apply different voltages per sub-area to a plurality of the first electrodes for a plurality of the lens areas, respectively, the voltage source applying a constant voltage to the second electrode, and a liquid crystal layer 55 provided between the first and second substrates 50 and 60.

In this case, the first electrodes 51 are connected to metal lines 65 for applying the different voltages V0 to Vmax via contact holes 70, respectively.

The electrically-driven liquid crystal lens according to the present invention has a function of projecting a 3D video signal according to a profile of a lens surface from a 2D video signal. The electrically-driven liquid crystal lens is located over a display panel (not shown in the drawings) for 2D implementation and plays a role in projecting the 3D video signal or the 2D video signal selectively according to a presence or non-presence of voltage application. In particular, using the property of transmitting light in case of the non-presence of the voltage application, the electrically-driven liquid crystal lens is LAO able to play a role as a switch for a 2D display in case of the non-presence of the voltage application or a 3D display in case of the presence of the voltage application.

In this case, the first and second electrodes 51 and 61 are formed of transparent metal to prevent loss of transmittance at the portions where the electrodes are located, respectively.

In forming a liquid crystal electric field lens having one parabolic shape for the lens area, the first voltage V0 approximately corresponding to a threshold voltage is applied to a center of the lens area. And, the $n^{th}$ voltage Vmax, which is the highest, is applied to the first electrode located at an edge portion of each of the lens areas. Regarding the voltages applied to the first electrodes 51 located between the center and edge of the lens area, respectively, the voltage ranging from the first voltage V0 to the $n^{th}$ voltage Vmax is applied in a manner of increasing gradually away from the center of the lens area. Thus, if the voltages are applied to the second electrode 61, respectively, such a constant voltage as a ground voltage, a threshold voltage and the like is applied to a plurality of the first electrodes 51 to form a vertical electric field between the first electrode 51 and the second electrode 61.

A plurality of the first electrodes 51 are formed in the lens area to be bisymmetric with respect to the centre of the lens area. The first electrodes 51 are connected to the corresponding voltage sources V0 to Vmax via the voltage applying lines 65 on a pad part (corresponding to a non-display unit of the display panel) to receive the corresponding voltages, respectively.

In this case, the smallest threshold voltage V0 applied to the first electrode 51 is a rectangular pulse having a peak value set to about 1.4~2 volts and can be calculated by $$\pi \sqrt{\frac{K1}{\Delta \varepsilon \varepsilon 0}}$$

($\Delta \in$ is liquid crystal dielectric anisotropy, K1 is an elastic coefficient of liquid crystal, and $\in_0$ is a free space dielectric constant). Moreover, the highest voltage among the voltages applied to the first electrode 51 to correspond to the edge of the lens area is an AC rectangular pulse having a peak value set to about 2.5~10 volts.

The lens area L having the shape shown in FIG. 3 and FIG. 4 is repeated in a horizontal direction having periodicity set to one pitch P.

A plurality of the first electrodes 51 are formed in a rod shape along a vertical direction of the first substrate 50 (direction of penetrating the drawing). A width of each of the first electrodes 51 is set to 5~10 μm. A gap between the first electrodes 51 adjacent to each other is set to 5~10 μm. For instance, a pitch is variable between 90~1,000 μm. 10 to 100 pitches can be formed per lens area according to a width and a spaced gap of the first electrode 51.

Besides, a seal pattern is formed on a periphery area (i.e., non-display area including the pad part) of the first and second substrates 50 and 60 to support (not shown in the drawings). Moreover, the liquid crystal layer 55 between the first and second substrates 50 and 60 is formed to have a sufficient thickness to form the electrically-driven liquid crystal lens in a sufficient phase in a manner of adding a predetermined margin to a maximum height of the parabolic lens. In order to stably support the thickness of the liquid crystal layer 55, ball or column spacers can be further provided to support cell gaps between the first and second substrates 50 and 60. In this case, the spacers are preferably provided to positions not to distort the phase of the electrically-driven liquid crystal lens.

Yet, as mentioned in the foregoing description, in case of the LC electric field lens configured to construct one parabolic lens per pitch, since a height of the parabolic lens is big, it is requested to form the liquid crystal layer with the value resulting from adding the height of the parabolic lens and the predetermined margin together. Hence, the liquid crystal layer should be formed to have a considerable thickness to consume a considerable quantity of liquid crystals for the liquid crystal layer, whereby process load and cost may be raised.

Besides, in case that a liquid crystal display panel is provided under the electrically-driven liquid crystal lens, a thickness of the liquid crystal display panel is set to a range of 3~5 μm. And, a process is established on this condition. In case that one parabolic lens is provided per pitch, the thickness is normally set to 20 or higher. Hence, a general liquid layer forming process considerably degrades the process performance of the electrically-driven liquid crystal lens.

In the following description, an example for adopting a scheme of fresnel lens to reduce a thickness of a liquid crystal layer is explained.

Figure 5:
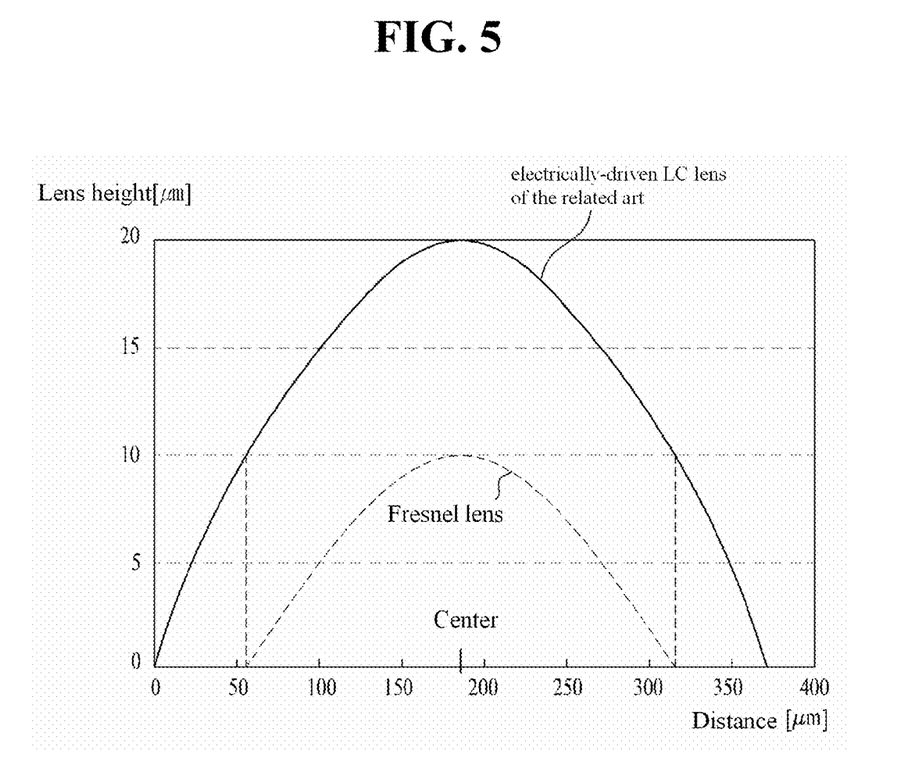

FIG. 5 is a graph for a fresnel lens compared to a general electrically-driven liquid crystal lens if the electrically-driven liquid crystal lens shown in FIG. 3 or FIG. 4 is divided into a plurality of isotropic fresnel lenses.

First of all, a fresnel lens is one of condenser lenses and has aberration set small to reduce its thickness in a manner of providing several band patterns and giving a role of prism to each of the band patterns.

Referring to FIG. 5, for instance, in case of applying a fresnel lens to an electrically-driven liquid crystal lens, one pitch is divided into a plurality of intervals, a relatively smaller parabolic lens is provided to a center and the rest of the right and left areas use one curved surface of a virtual parabolic lens up to a value corresponding to a maximum height of the fresnel lens at the center.

In case of adopting the fresnel lens, a discontinuity surface is formed on the boundary between the parabolic type lens at the center and one curved surface of the right and left virtual parabolic lenses.

Yet, in case of applying the fresnel lens to the electrically-driven liquid crystal lens, since a width corresponding to one pitch is not wide enough, limitation is put on dividing the pitch. And, a boundary between the divided regions of the pitch has a discontinuity surface to generate error. Since a distortion value of the electrically-driven liquid crystal lens is correspondingly generated, this problem needs to be solved.

In the following description, in case of applying a fresnel lens by dividing one pitch of a lens area into a plurality of regions, one example for designing an electrically-driven liquid crystal lens in consideration of an error value of a discontinuity surface between the regions is explained.

Figure 6:
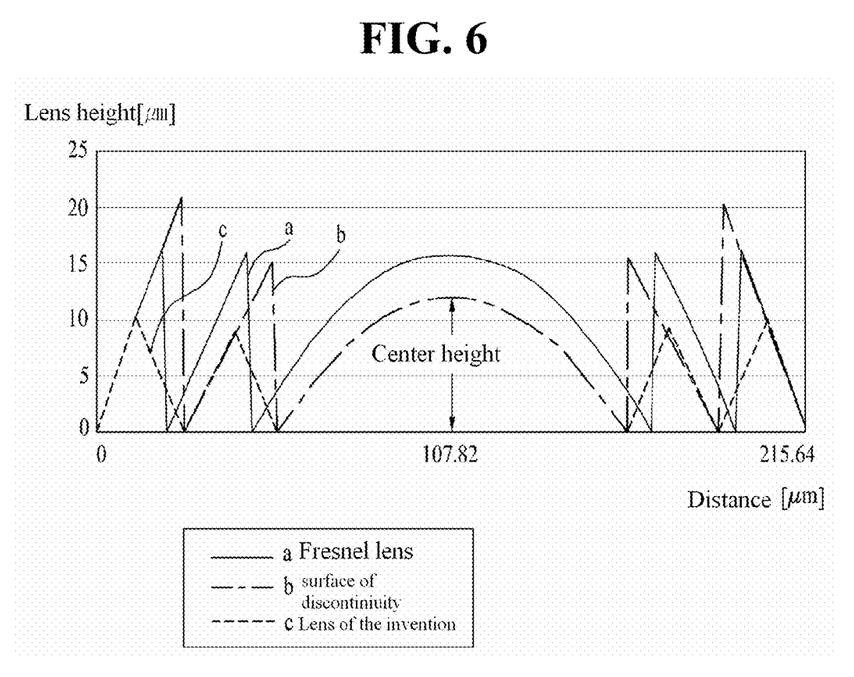
FIG. 6 is a comparison graph of a liquid crystal lens per region in case of dividing one pitch into a plurality of fresnel lenses anisotropically and a liquid crystal lens per region in case of dividing one pitch into a plurality of fresnel lenses isotropically.

FIG. 6 is a comparison graph of a liquid crystal lens per region in case of dividing one pitch into a plurality of fresnel lenses anisotropically and a liquid crystal lens per region in case of dividing one pitch into a plurality of fresnel lenses isotropically.

In FIG. 6, 'a' shows a case of dividing one pitch of a lens area into a plurality of regions to have an isotropic lens height and applying general fresnel lenses (non-electrically-driven liquid crystal lens) to a plurality of the regions to have ⅓ lens height, 'b' shows an example for dividing one pitch of a lens area into a plurality of regions and applying fresnel lenses to the rest of the regions except the center to have peaks of different lens heights on region boundaries, respectively, and 'c' indicates an example for dividing one pitch of a lens area into a plurality of regions and applying fresnel lenses by setting lens heights to have different peaks at centers of the regions, respectively. In particular, the graph of the 'c' shown in FIG. 6 corresponds to the electrically-driven liquid crystal lens of the present invention.

In the graph corresponding to 'a', compared to the small parabolic lens at the center, the graph in the regions right or left to the center corresponds to one curved surface off a parabola having a peak point having a height triple to that of the small parabolic lens at the center. The graph in the rest of the regions except the center corresponds to one curved surface of the parabola having the same shape. And, a lens shape is turned in a manner that the graph has a value of 0 at a peak of each boundary of the regions. For instance, when a peak height of a virtual parabola is 49.1 μm, the graph 'a' is set to have a height of about 16.4 μm amounting to ⅓ in the small parabolic lens at the center and the peaks of the lens heights in the rest of the regions are set to the same value. Yet, this indicates an example for applying the non-electrically-driven liquid crystal lens. In case of forming an electrically-driven liquid crystal lens with an optical path difference like a real electrically-driven liquid crystal lens, an error value is generated from the discontinuity surface.

In the graph corresponding to the 'b', one pitch is divided into a plurality of regions and fresnel lenses differing in height are applied as an electrically-driven liquid crystal lens to the regions, respectively. The graph 'b' proposes a shape that lens peaks are provided to the boundaries of the regions in the right and left regions except the center. Yet, in applying different heights to the regions, respectively, the corresponding height becomes relatively higher than a height of an original fresnel lens due to the property of the discontinuity surface of the boundary of the regions. Hence, the lens height on the edge is big, whereby thickness of a liquid crystal layer increases.

In the graph corresponding to an electrically-driven liquid crystal lens of the present invention, when fresnel lenses differing in height are applied by dividing one pitch of the electrically-driven liquid crystal lens into a plurality of sub-areas, a lens peak is provided to a center of each sub-areas instead of a boundary of the sub-areas and lenses are formed bisymmetric with respect to a center of each sub-area. In this case, the lens peak is provided to the sub-area including the center and corresponds to one curved surface of a virtual parabola in the rest of the sub-areas. A corresponding voltage is then applied. For instance, compared to the graph 'a' in FIG. 6, the lens height at the center is lowered, whereby thickness of the liquid crystal layer included in the whole electrically-driven liquid crystal lens can be reduced. In the example shown in the drawing, the thickness is 11.8 μm and is reduced down by about 20% in thickness of the original fresnel lens. Occasionally, the height of the center of the lens area is variable by modification of a voltage value applied to each of the first electrodes.

Figure 8:
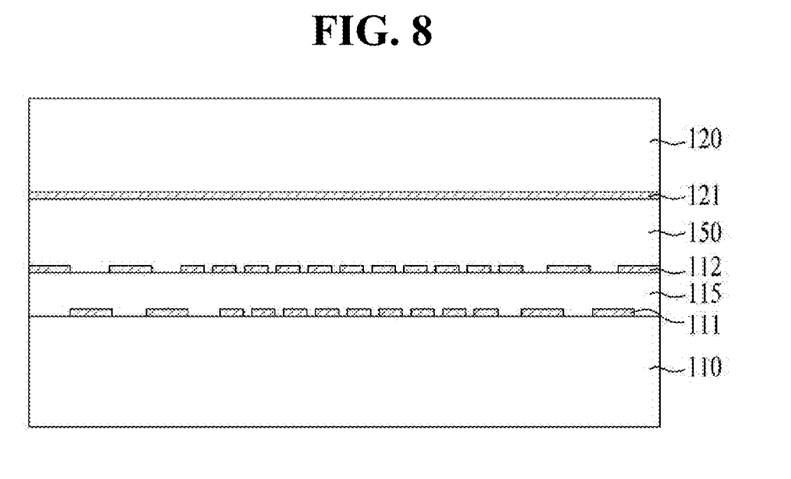
FIG. 8 is a cross-sectional diagram of an electrically-driven liquid crystal lens according to the present invention.
Figure 9:
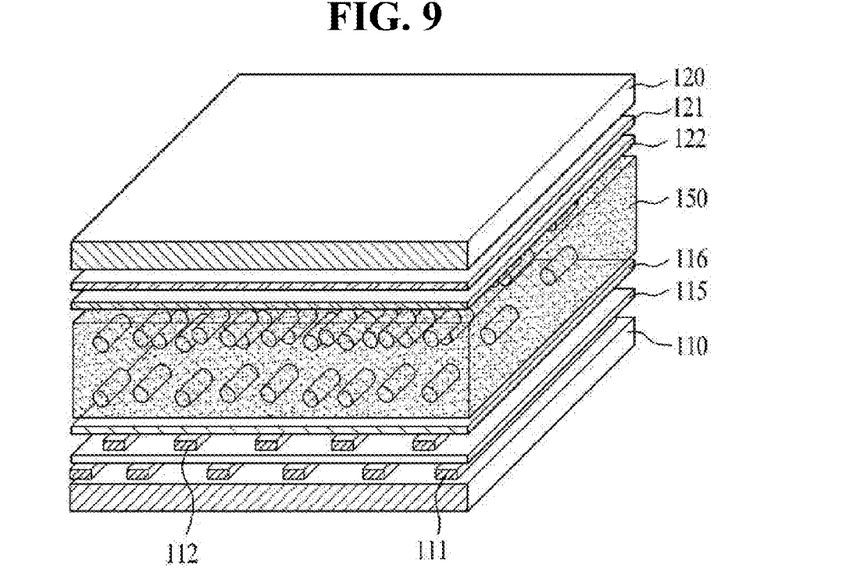
FIG. 9 is a perspective diagram of the electrically-driven liquid crystal lens shown in FIG. 8.

In this case, the electrically-driven liquid crystal lens of the present invention can include a plurality of the first electrodes shown in FIG. 3 and a second electrode having a box electrode shape or can use the following structure shown in FIG. 8 and FIG. 9.

Occasionally, regarding a plurality of sub-areas per lens area, a lens of a parabolic shape having a leak at a center of a lens area is symmetrically formed in the sub-area including the center of the lens area. Regarding the left and right sub-areas of the lens area, a lens of a triangle type is symmetrically formed in the left and right sub-areas. For this, different voltages are applied to provide the lens shape corresponding to the 'c' in FIG. 6.

In case of the triangle-shape lens formed in each of the left sub-areas, one side is formed to correspond to one curved surface of a virtual parabolic lens and the other side is gradually lowered in a zone (horizontal width), in which the discontinuity surface of the 'b' is generated, from a lens height peak of the corresponding sub-area.

When a voltage of the voltage source is applied, the sub-area including the center of the lens area is set to have a greatest lens height. In this case, in the sub-area including the center of the lens area, voltages are applied to the first electrodes located from the center to the edge in a manner that the voltages are gradually raised, respectively.

Moreover, in the left and right sub-areas of the lens area, different voltages are applied to the first electrodes in the parts, in which the triangle-shape lenses are formed, respectively in a manner that one side of the triangle-shape lens corresponds to a value amounting to a curved surface of a virtual parabolic lens.

In the each sub-areas of the lens area, a smallest voltage is applied to the center and the voltage increasing toward the edge is applied to the edge.

Figure 7:
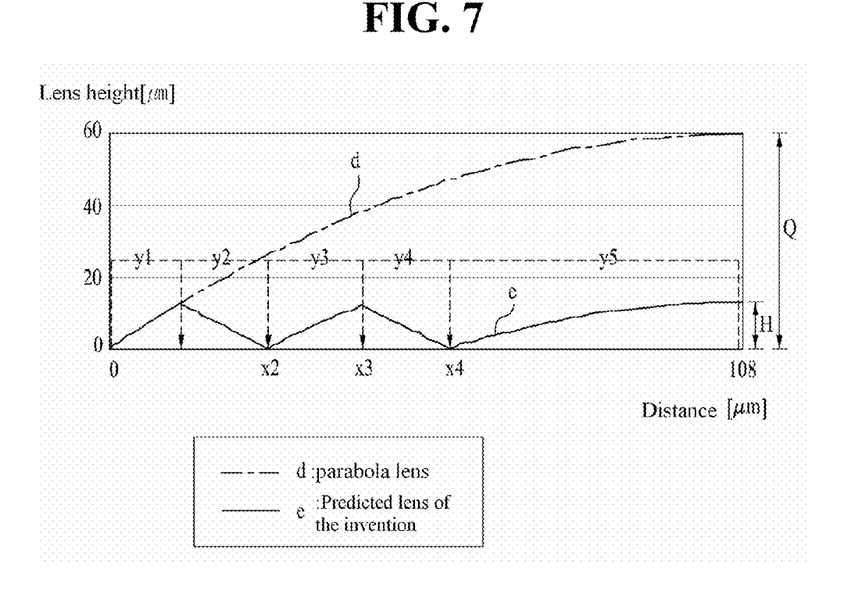
FIG. 7 is a graph of a lens shape predicted when fresnel lenses by dividing a lens height into different heights are implemented with an electrically-driven liquid crystal lens of the present invention.

FIG. 7 is a graph of a lens shape predicted when fresnel lenses by dividing a lens height into different heights are implemented with an electrically-driven liquid crystal lens of the present invention.

Referring to FIG. 7, for example, a coordinate value per area of an electrically-driven liquid crystal lens of the present invention is calculated. First of all, one pitch of a lens area is set to p. A maximum height of a referred-to virtual parabolic lens d is set to q. A lens height of a sub-area including a center of the lens area is set to h. and, an erroneous part width predicted in implementing a fresnel lens in an electrically-driven liquid crystal lens is set to d. The coordinate value is a correlation value of each region $(x_n, y_n)$ of electrically-driven liquid crystal lens prediction e of the present invention.

In this case, a height y of a referred-to virtual parabolic lens is $$-\frac{4q}{p^2}\left(x-\frac{p}{2}\right)^2 + q.$$

And, the correlation value of the region $(x_n, y_n)$ is represented as follows.

$$x_1 = x|_{y=h}$$
$$x_2 = x_1 + d$$
$$x_3 = x|_{y_3=h}$$
$$x_4 = x_3 + d$$

-continued $$y_1 = y$$

$$y_2 = -\frac{y|_{x=x1}}{d}x + x_2 \times \frac{y|_{x=x1}}{d}$$

$$y_3 = y - y|_{x=x2}$$

$$y_4 = -\frac{y|_{x=x3}}{d}x + x_4 \times \frac{y|_{x=x3}}{d}$$

$$y_5 = y - y|_{x=x4}$$

FIG. 8 is a cross-sectional diagram of an electrically-driven liquid crystal lens according to the present invention. FIG. 9 is a perspective diagram of the electrically-driven liquid crystal lens shown in FIG. 8.

Compared to FIG. 3 and FIG. 4, FIG. 8 and FIG. 9 show the following example. First of all, first electrodes 111 and 112 are divided into two groups. An insulating interlayer 115 is provided between the two groups. And, the first electrodes 111 and 112 are formed in a manner that widths and spaces are gradually decreased toward a center from edges.

An electrically-driven liquid crystal lens according to the present invention is described in detail as follows.

An electrically-driven liquid crystal lens according to the present invention includes first and second substrates 110 and 120 arranged to oppose each other in a manner that a plurality of lens areas are defined therein, a plurality of first electrodes 111 of a first group provided to the lens areas on the first substrate 110 by being spaced apart from each other, an insulating interlayer 115 formed on the first substrate 110 to have the first electrodes 111 of the first group covered with, first electrodes 112 of a second group formed on the insulating interlayer 115 in a manner of being at least overlapped with portions of the first substrate 110 free from the first electrodes 111 of the first group, a first alignment layer 116 (omitted from FIG. 8) formed on the first electrodes 112 of the second group, a second electrode 121 formed on a whole surface of the second substrate 120, a second alignment layer 122 on the second electrode 121, a voltage source (V0 to Vmax) configured to apply different voltages to the first electrodes per sub-area, respectively in a manner that each of the lens areas is divided into a plurality of sub-areas like the 'c' shown in FIG. 6, the voltage source configured to apply a constant voltage to the second electrode, and a liquid crystal layer 150 inserted between the first and second substrates 110 and 120.

The lens area is defined to have a width corresponding to one pitch. The lens area L having the same pitch is periodically repeated in one direction (horizontal direction in FIG. 4). In this case, one pitch P indicates a horizontal width of one lens area. The lens area does not have such a physical lens shape as a convex lens but indicates an area having lens functionality in a manner that liquid crystals are aligned according to application of an electric field. A distance between a center o of the lens area L and an edge E of the lens area L is P/2. And, a lens is configured to have a shape bilaterally symmetric with respect to the center of the lens area.

The first and second alignment layers 116 and 122 enables the electrically-driven liquid crystal lens to play a role as a transmittive layer in an initial state in case of non-presence of voltage application. For this, a rubbing direction of the first alignment layer 116 is set equal to that of the first electrodes 111 and 112 and a rubbing direction of the second alignment layer 122 is set to cross with that of the first alignment layer 116. Trough this, a 2D image can be transmittively transferred to an observer from a display panel (not shown in the drawings).

The rest of the parts in FIG. 8 and FIG. 9 are not described herein but refer to the former descriptions of to the same or like parts in FIG. 3 and FIG. 4.

In the electrically-driven liquid crystal lens according to the present invention, the voltage application is set to apply different voltages to the sub-areas per pitch, respectively.

Figure 10:
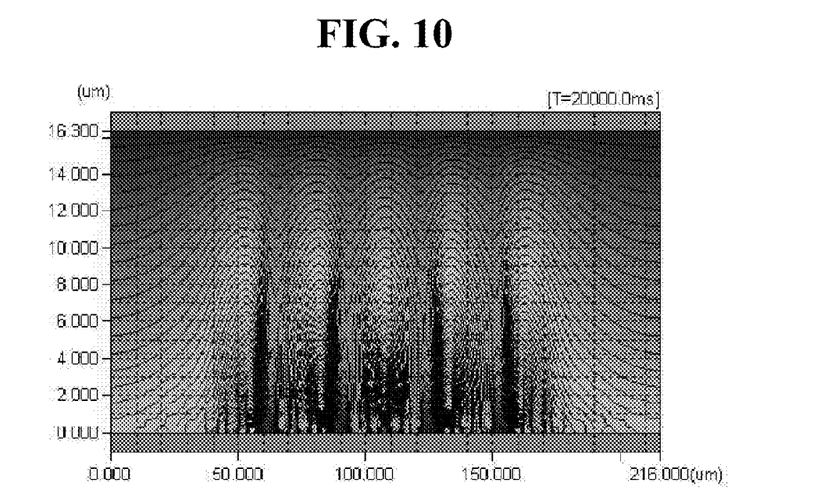
FIG. 10 is a cross-sectional diagram for arrangement per pitch in simulation of an electrically-driven liquid crystal lens according to the present invention.
Figure 11:
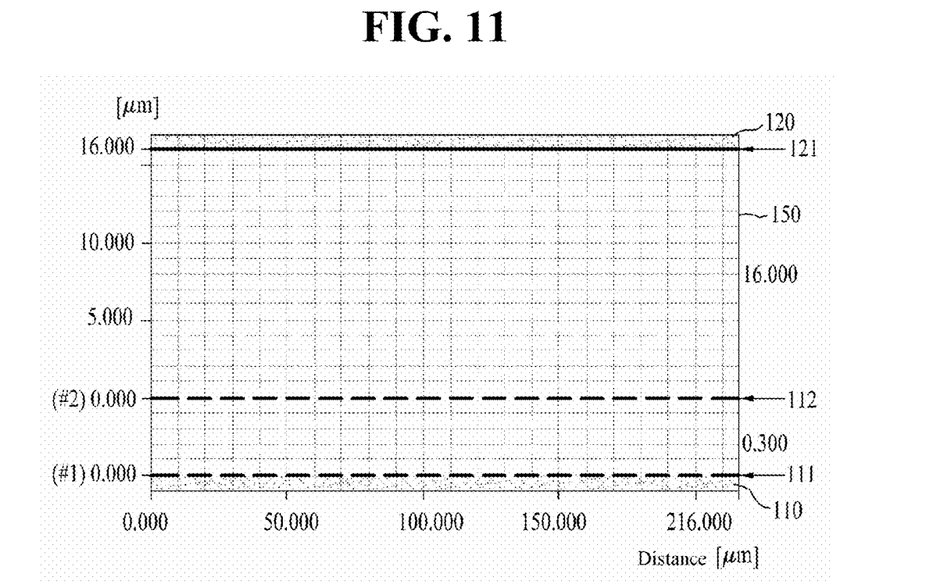
FIG. 11 is a diagram of the potential simulation shown in FIG. 10.

FIG. 10 is a cross-sectional diagram for arrangement per pitch in simulation of an electrically-driven liquid crystal lens according to the present invention. FIG. 11 is a diagram of the potential simulation shown in FIG. 10.

Referring to FIG. 10, for example, the first electrodes 111 of the first group and the first electrodes 112 of the second group are formed with the same interval and width. The first electrodes 112 of the second group are arranged to be slightly misaligned with the first electrodes of the first group in a manner of being at least overlapped with portions of the first substrate 110 free from the first electrodes 111 of the first group.

In this example, the liquid crystal layer 150 is formed about 16 μm thick. And, this example corresponds to the former example for the case of setting a peak (lens height at the center of the sub-area) of the real electrically-driven liquid crystal lens in the graph c shown in FIG. 6 to 11.8 μm. And, a margin of about 4.2 μm is added to the peak to provide the example for forming the liquid crystal layer.

In this graph, if one pitch of the lens area is set to 215.64 μm, a portion indicated by o corresponds to the center (peak of lens height) of the lens area and a portion corresponding to 107.82 μm on a horizontal axis corresponds to the edge of the lens area.

Regarding potentials, a highest potential is located at about 56 μm on a horizontal axis. In this case, if the lens area ranging from 0 μm to about 56 μm on the horizontal axis is divided into a plurality of sub-areas, a half shape of a parabola corresponds to the sub-area including the center of the lens area having the height ranging from a peak to 0.

Positions corresponding to 82 μm and 107.82 μm have potentials of high points, respectively. These positions correspond to low points of the lens, respectively.

Figure 12:
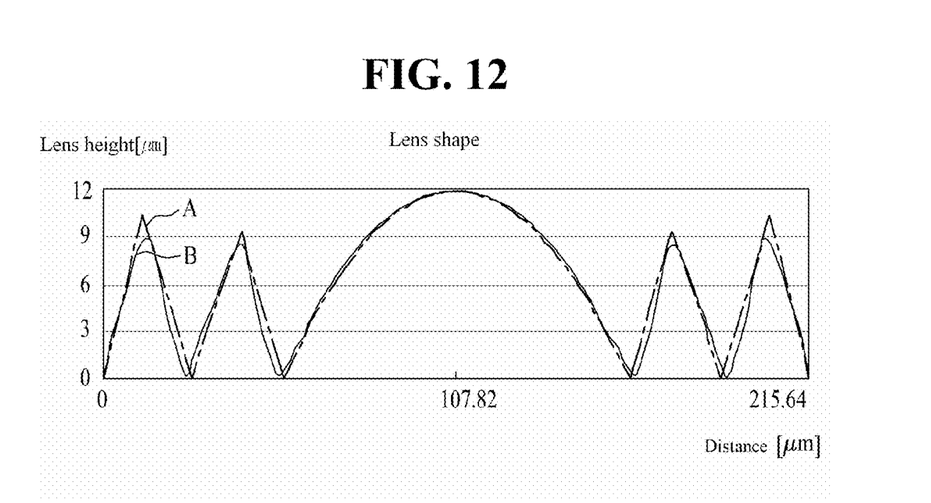
FIG. 12 is a graph of comparison between a lens shape formed by the implementation of the electrically-driven liquid crystal lens shown in FIG. 10 and a predicted lens shape.

FIG. 12 is a graph of comparison between a lens shape formed by the implementation of the electrically-driven liquid crystal lens shown in FIG. 10 and a predicted lens shape.

FIG. 12 shows a graph when the graph shown in FIG. 11 is shifted by 107.82 μm on a horizontal axis. In FIG. 12, 'A' indicates a predicted graph of an electrically-driven liquid crystal lens according to the present invention and 'B' indicates a real application graph of an electrically-driven liquid crystal lens according to the present invention. It can be observed that most of the two graphs are overlapped with each other at the center of the sub-area. Although the two graphs are slightly different from each other at the peaks of the outer lenses, it can be observed that the electrically-driven liquid crystal lens can be almost implemented without error.

Figure 13:
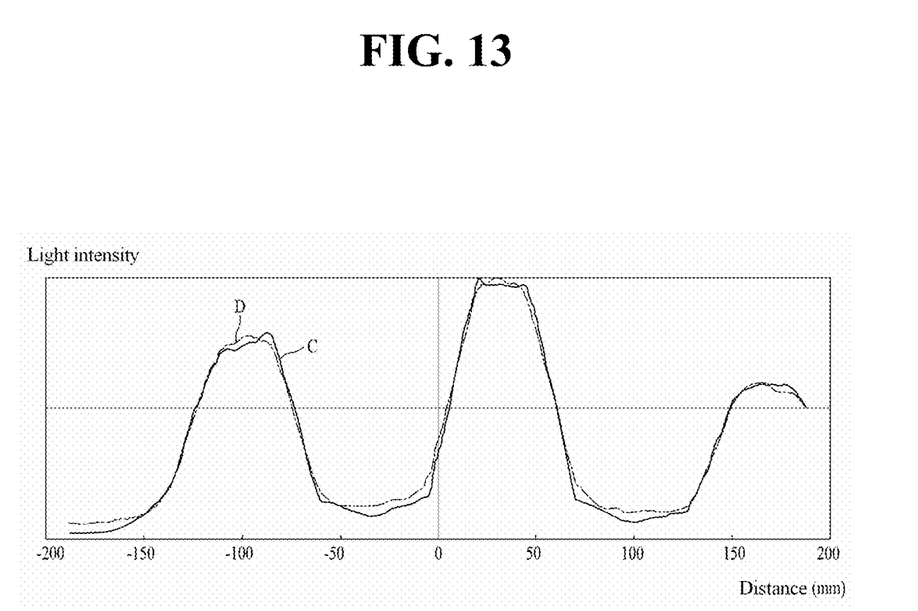
FIG. 13 is a graph of light intensity per distance using one eye in prediction or real application of an electrically-driven liquid crystal lens according to the present invention.

FIG. 13 is a graph of light intensity per distance using one eye in prediction or real application of an electrically-driven liquid crystal lens according to the present invention.

FIG. 13 shows a corresponding light intensity when a horizontal displacement is adjusted at an optimal viewing distance 350 mm in case of observing an electrically-driven liquid crystal lens using either a right or left eye. It can be observed that values of prediction and real application are almost equal to each other.

In this case, an interval between two eyes is 65.5 mm. FWHM (full width at half maximum) is 56.1 mm in each case of the prediction and the real application. A crosstalk rate corresponding to a value resulting from dividing a minimum of light intensity by a maxim thereof is equal to or smaller than 7.7% in case of the prediction. The crosstalk rate is equal to or smaller than 9.7% in case of the real application. Hence, there is a crosstalk rate difference only.

Therefore, it can be observed that the electrically-driven liquid crystal lens is formed with a value approximate to the prediction in case of the application of the electrically-driven liquid crystal lens of the present invention.

In case of the horizontal displacement adjustment of the optimal viewing distance shown in FIG. 13, the corresponding light intensity graph corresponding to one of the left and right eyes is illustrated. In case of the other eye, the light intensity graph of the other eye is configured in a manner of inverting the former graph with respect to the point at the graph of the drawing.

Regarding a liquid crystal display device, when a thickness of a liquid crystal layer provided between electrodes on different substrates of an electrically-driven liquid crystal lens is defined, one pitch of a lens area is divided into a plurality of sub-areas. Voltage is applied to each of the sub-areas, respectively. Since it is able to lower a lens height of a peak, the thickness of the liquid crystal layer can be reduced. In particular, different voltage applied intervals are provided according to a plurality of the areas per pitch of the lens area, respectively. In a manner that the lens height is lowered toward an edge from center, and vice versa, if the liquid crystal layer is provided with a value resulting from adding a predetermined margin to the lens height of the peak, the electrically-driven liquid crystal lens becomes drivable. Therefore, the liquid crystal layer needs not to have an extra margin in consideration of a discontinuity surface of a lens, whereby the thickness of the liquid crystal layer needs not to be raised unnecessarily.

Moreover, in the right and left sub-areas except the sub-area at the center in a parabolic shape, a voltage value is set in a manner of setting one side to one curved surface of the parabolic shape and considering the opposing lateral side (corresponding to an error width of a general fresnel lens), whereby a height of an actually implemented lens can be lowered.

Therefore, when a lens area is divided into a plurality of areas per pitch, limitation is put on the division for a plurality of the areas. Although the number of the sub-areas divided per pitch is not incremented, the present invention is able to reduce the thickness of the liquid crystal layer according to differential lens height distribution.

Eventually, the present invention reduces a thickness of a liquid crystal layer, thereby providing a slim stereoscopy display device and reducing a rising cost. And, the present invention enables a focal distance to be decreased, thereby enhancing accuracy of a stereoscopy display.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An electrically-driven liquid crystal lens, comprising:
   first and second substrates configured to oppose each other by having a plurality of lens areas defined correspondingly thereon;
   a plurality of first electrodes respectively provided to the lens areas of the first substrate, the first electrodes being spaced apart from each other;
   a second electrode formed on a whole surface of the second substrate;
   a first voltage source configured to apply different voltage groups to sub-areas of each lens area to have different lens height corresponding to different sub-areas of each lens area,
   a second voltage source configured to apply a constant voltage to the second electrode; and
   a liquid crystal layer provided between the first and second substrates,
   wherein a greatest lens height is provided to a center of each sub-area, and
   wherein lenses are bisymmetric with respect to a center of each sub-area.

2. The electrically-driven liquid crystal lens of claim 1, wherein the first voltage source applies the different voltages to a plurality of the sub-areas of each of the lens area, respectively to form a symmetric lens of a parabolic shape having a center of the lens area set to a peak in the sub-area including the center of the lens area and to form a lens of a triangle shape symmetric with respect to the left and right sub-areas of the lens area.

3. The electrically-driven liquid crystal lens of claim 2, wherein when a voltage is applied to the first voltage source, a greatest lens height is provided to the sub-area including the center of the lens area.

4. The electrically-driven liquid crystal lens of claim 2, wherein the different voltages are increasingly applied to the sub-area including the center of the lens area in a manner of being applied to the first electrodes located in a range from a center of the sub-area to an edge of the sub-area, respectively.

5. The electrically-driven liquid crystal lens of claim 2, wherein the different voltages are applied to the first electrodes for forming the lens of the triangle shape in the left and right sub-areas of the lens area in a manner that a value amounting to a curved surface of a virtual parabolic lens corresponds to one side of the lens of the triangle shape.

6. The electrically-driven liquid crystal lens of claim 1, wherein a plurality of the first electrodes are formed on a same layer on the first substrate.

7. The electrically-driven liquid crystal lens of claim 1, further comprising at least one insulating layer on the first substrate, wherein the at least one insulating layer and a plurality of the first electrodes are differently located on the first substrate.

8. A stereoscopy display device, comprising:
   an electrically-driven liquid crystal lens, comprising:
      first and second substrates arranged to oppose each other in a manner that a plurality of lens areas are defined therein;
      a plurality of first electrodes of a first group provided to the lens areas on the first substrate by being spaced apart from each other;
      a second electrode formed on a whole surface of the second substrate; and
      a liquid crystal layer inserted between the first and second substrates;
   a display panel provided under the electrically-driven liquid crystal lens to transfer a two-dimensional (2D) video signal; and
   a first voltage source configured to apply voltages different per sub-area to the first electrodes, respectively in a manner that each of the lens areas is divided into a plurality of sub-areas to differ from each other in lens height;

a second voltage source configured to apply a constant voltage to the second electrode, wherein a greatest lens height is provided to a center of each sub-area, and wherein lenses are bisymmetric with respect to a center of each sub-area.

9. The stereoscopy display device of claim 8, wherein a 2D or 3D switching is performed according to an operation of the voltage source.

10. The stereoscopy display device of claim 8, wherein in case of a 3D display, the voltages are applied to the first and second electrodes via the voltage source in a manner that the different voltages are applied to a plurality of the sub-areas of each of the lens area, respectively to form a symmetric lens of a parabolic shape having a center of the lens area set to a peak in the sub-area including the center of the lens area and to form a lens of a triangle shape symmetric with respect to the left and right sub-areas of the lens area.

11. The stereoscopy display device of claim 10, wherein when a voltage is applied to the voltage source, a greatest lens height is provided to the sub-area including the center of the lens area.

* * * * *